(12) United States Patent  
Yasuda (10) Patent No.: US 7,369,283 B2  
(45) Date of Patent: May 6, 2008

(54) COLOR IMAGE READING APPARATUS AND COLOR IMAGE READING METHOD FOR ELIMINATING OR REDUCING MOIRE

(75) Inventor: Naohiro Yasuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 958 days.

(21) Appl. No.: 10/365,223

(22) Filed: Feb. 12, 2003

(65) Prior Publication Data

US 2003/0156302 A1 Aug. 21, 2003

(30) Foreign Application Priority Data

Feb. 21, 2002 (JP) .............................. 2002-044264
Dec. 5, 2002 (JP) .............................. 2002-353408

(51) Int. Cl.  
*H04N 1/46* (2006.01)

(52) U.S. Cl. ...................... 358/509; 358/530; 358/533; 358/513

(58) Field of Classification Search ........ 358/500–501, 358/505, 509, 515, 523, 530, 533, 475, 513–514; 382/162, 264, 274, 275  
See application file for complete search history.

(56) References Cited

U.S. PATENT DOCUMENTS

| | | | |
|---|---|---|---|
| 4,930,008 | A | 5/1990 | Suzuki et al. |
| 5,191,406 | A | 3/1993 | Brandestini et al. |
| 5,859,712 | A | 1/1999 | Kim |

FOREIGN PATENT DOCUMENTS

| | | |
|---|---|---|
| EP | 0822706 | 2/1998 |
| JP | 5196894 | 8/1993 |

OTHER PUBLICATIONS

U.S. Appl. No. 10/007,279, filed Nov. 12, 2001.

*Primary Examiner*—Cheukfan Lee  
(74) *Attorney, Agent, or Firm*—Cooper & Dunham, LLP

(57) ABSTRACT

A color image reading apparatus reads an original image by a line sensor through sequentially lighting respective light sources of a plurality of colors with respect to a scan line. An analog-to-digital converter converts an analog image signal read by said line sensor to digital image data. A lighting frequency ratio setting part sets the lighting frequency ratio for the light sources such that not all of the light sources are equally lighted. A thinning control part performs thinning control of lighting lines according to the lighting frequency ratio at which the light sources are lighted. A read data combining part combines read data of the plurality of colors according to a predetermined combination, said read data being obtained by the thinning control.

28 Claims, 11 Drawing Sheets

COLOR IMAGE READING APPARATUS AND COLOR IMAGE READING METHOD FOR ELIMINATING OR REDUCING MOIRE

BACKGROUND OF THE INVENTION

1. Field of the Invention

The present invention relates to one-pass scan type (line scanning type) color image reading apparatuses capable of eliminating or reducing moiré in the sub-scanning direction.

2. Description of the Related Art

Smaller and manufacturing-cost-saving color image reading apparatuses that light (energize) each of the light sources of RGB in a line sequential order and use an equi-magnification image sensor are achieved. Such color image reading apparatuses are widely used in image scanners and facsimile machines.

The color image reading apparatuses can generate color image data for one line by sequentially lighting each of the light sources of RGB such that an area of an original corresponding to one line is scanned by each of the light sources of RGB equally for ⅓ of the line, and by combining obtained color component signals.

The conventional color image reading apparatuses read an image by emitting lights of R, G and B to an original image and forming an image with the reflected lights on an acceptance surface having a plurality of image pickup devices. In such color image reading apparatuses, an optical system is provided between an imaging part (lens) and the acceptance surface (photo acceptance unit). The optical system includes at least two kinds of low-pass characteristics with respect to the direction in which the photo acceptance unit is arranged.

Figure 1A:
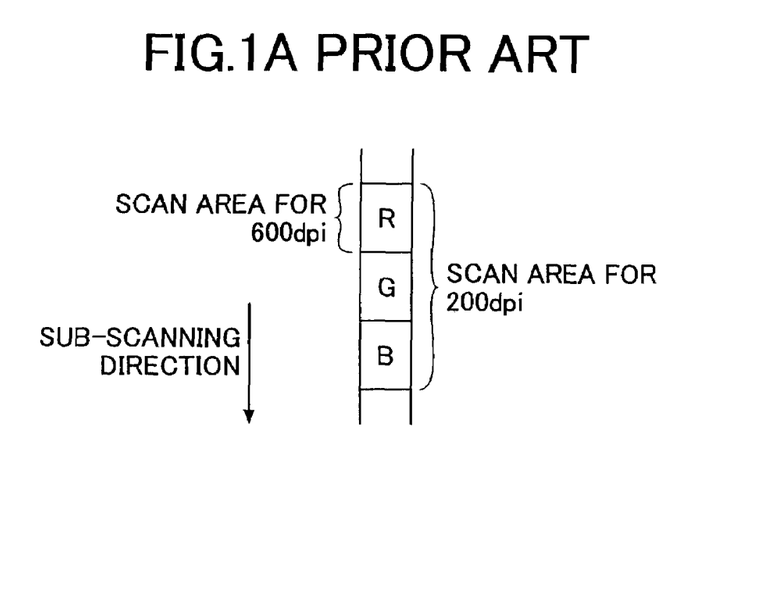
FIG. 1A is a schematic diagram showing scan areas for 200 dpi and 600 dpi.

The ratio of the area scanned by each of the light sources of RGB is equal irrespective of the resolution in the sub-scanning direction of output color image data. For example, as shown in FIG. 1A, the ratio among RGB is 1:1:1 in either a case where color image data of the resolution in the sub-scanning direction of 200 dpi are generated or a case where color image data of 600 dpi are generated. It should be noted that FIG. 1A shows a case where light emitting elements are lighted in the order of R, G and B, however, the same applies to a case where the light emitting elements are lighted in the order of R, B and G.

Figure 1B:
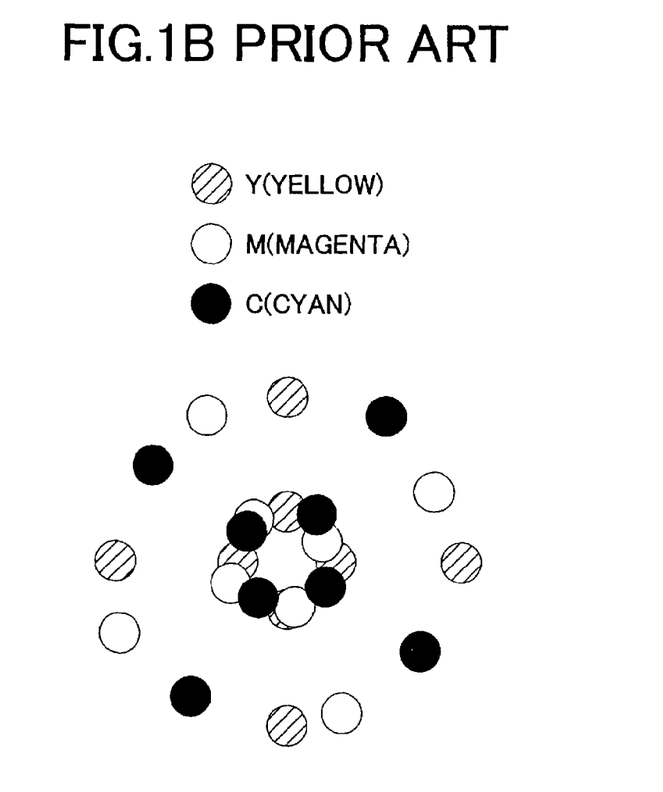
FIG. 1B is a schematic diagram showing a dot process (screening) using three colors of ink: cyan (C), magenta (M) and yellow (Y)

On the other hand, when performing exquisite color printing, a dot process (screening) is performed as a color expression technique. In the dot process, as shown in FIG. 1B, three colors of ink, cyan (C), magenta (M) and yellow (Y), are arranged in dot states. Various colors are expressed by the existence of dots of each color C, M, Y and the magnitude relation among the diameters.

Generally, the arrangement of dots of each color is determined using visual characteristics of human beings. More specifically, dots of yellow (Y), for which color human beings possess a low visual sensitivity, are laid out in the horizontal/vertical directions in which the visual sensitivity of human beings is high with respect to the angle. Dots of the other colors are laid out in oblique directions at separation angles of 30°.

In accordance with such an arrangement, dot intervals of each color and the size of the diameters of dots determine "smoothness" of a print. As for the dot interval, approximately 200 dpi is widely used.

When such a print is read by the one-pass scan type color image reading apparatus, depending on the resolution, moiré might be generated for a specific color.

Figure 2:
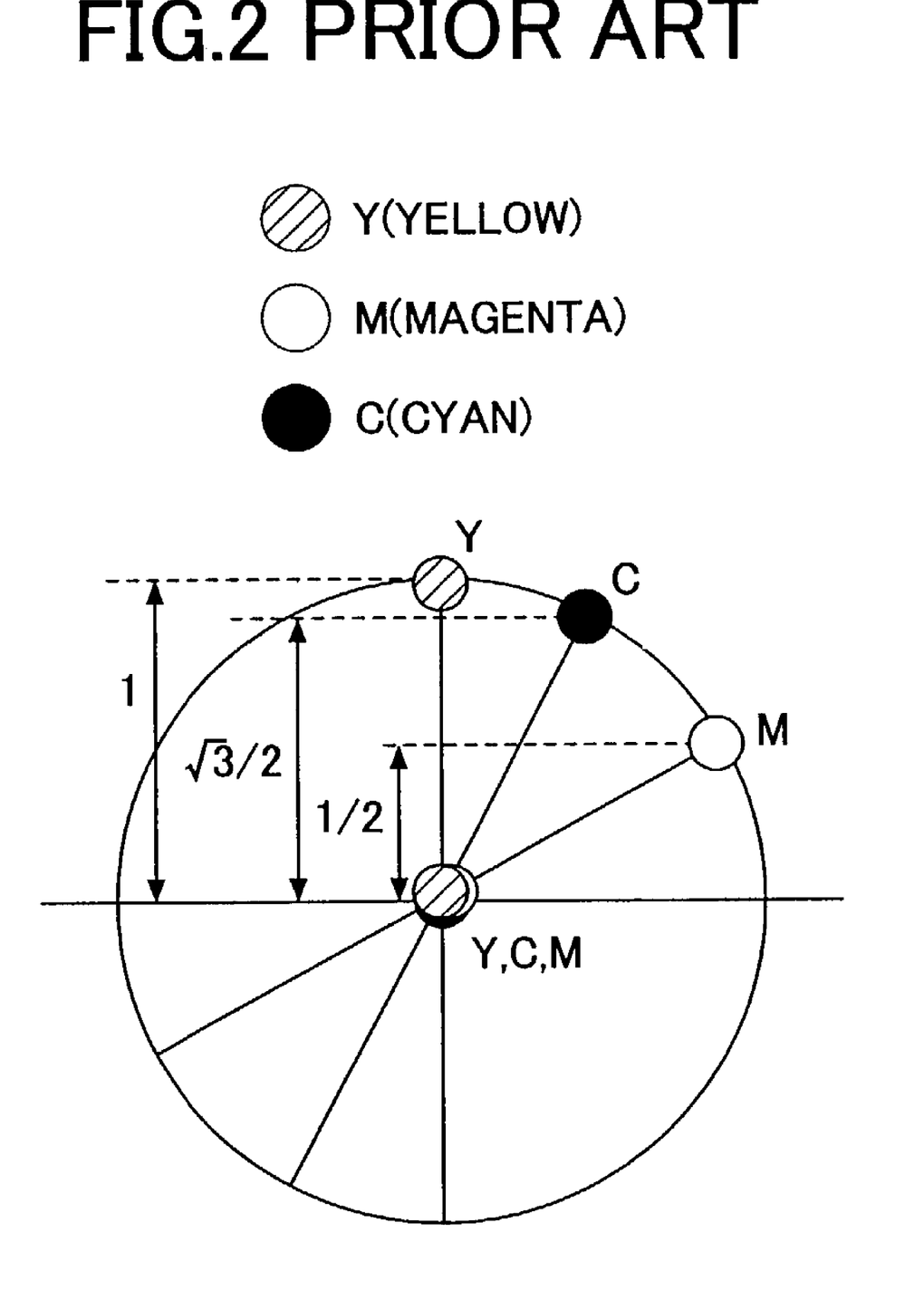
FIG. 2 is a schematic diagram for explaining occurrence of moiré and showing the respective distances between dots of cyan (C), magenta (M) and yellow (Y)
Figure 10A:
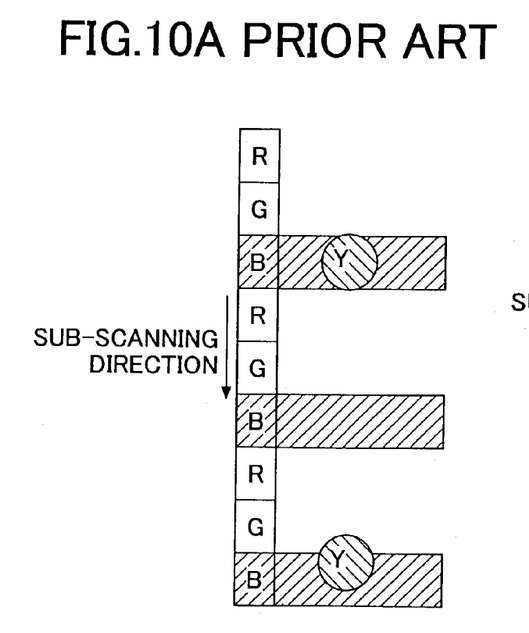
FIG. 10A is a schematic diagram for explaining the occurrence of moiré of Y (yellow) dots.

For example, a case is examined where a color print in which dots are laid out at an interval of 190 dpi in the sub-scanning direction is read by matching the up and down direction of the original image with the reading direction at the resolution of 200 dpi in the sub-scanning direction. In this case, as shown in FIG. 2, the dot intervals of the other colors are $(3/4)^{1/2}$ and ½ where the dot interval of Y (yellow) is 1 and dots of Y (yellow) are laid out in the vertical direction with respect to so-called raster scanning. The color having the closest dot interval to the interval of the scan resolution is Y (yellow). Accordingly, moiré tends to occur in Y (yellow) (refer to FIG. 10A).

Such a phenomenon tends to occur in an area where dots of Y (yellow) have the size with which size the dots are not coupled. For example, when expressing gray, which is a color of the original, such moiré of Y (yellow) occurs. When moiré of Y (yellow) occurs in the read image of such an area, a periodic solid area of Y (yellow) that does not seemingly exist in the original tends to be conspicuous. Thus, the quality of the print image is degraded. In addition, when the original is read at an angle, moiré as mentioned above might occur with respect to a color other than Y (yellow).

Further, it should be noted that moiré as mentioned above occurs not only when reading with RGB but also when reading a color original image by light sources of the other three colors or more than three colors.

Conventionally, a variety of countermeasures against moiré have been proposed. For example, Japanese Laid-Open Patent Application No. 05-196894 proposes a moiré reducing method of eliminating moiré by using two kinds of optical low-pass filters. However, in this method, the dedicated components (optical low-pass filters) are used, and besides, the method can only be applied to the reading part of a demagnification optical system using a CCD.

SUMMARY OF THE INVENTION

Accordingly, it is a general object of the present invention to provide an improved and useful color image reading apparatus in which the above-mentioned problems are eliminated.

It is another and more specific object of the present invention to provide, in the one-pass color scanning method, a color image reading apparatus capable of eliminating or reducing moiré of such as Y (yellow) occurring in a print created by using color dots.

In order to achieve the above-mentioned objects, according to one aspect of the present invention, there is provided a color image reading apparatus reading an original image by a line sensor through sequentially lighting respective light sources of a plurality of colors with respect to a scan line, including: an analog-to-digital converter converting an analog image signal read by the line sensor to digital image data; a lighting frequency ratio setting part setting the lighting frequency ratio for the light sources such that not all of the light sources are equally lighted; a thinning control part performing thinning control of lighting lines according to the lighting frequency ratio at which the light sources are lighted; and a read data combining part combining read data of the plurality of colors according to a predetermined combination, the read data being obtained by the thinning control.

It should be noted that, in the present invention, the color image reading apparatus includes such as a scanner mounted on a facsimile apparatus as well as an image scanner that is used independently.

Also, in the color image reading apparatus according to the present invention, when the light sources of the plurality of colors are red, green and blue light emitting diodes, the blue light emitting diode may be more frequently lighted than the red and green light emitting diodes.

That is, in the color image reading apparatus according to the present invention, read data in line units of RGB having the ratio of 1:1:1 are finally generated by setting the ratio of the number of light source lighting lines in scanning an original to other than 1:1:1 with respect to the number of lines of RGB that are to be input at the ratio of 1:1:1, fundamentally, and by performing a combining process on lines of each of the colors according to the ratio. Here, the ratio of the number of light source lighting lines does not refer to a ratio among lighting periods of the light sources, but a ratio expressed in the units of lines among video signals of respective color components designated by the colors of the light sources that are lighted during the scan time for one line defined by the photoelectric conversion storage time of the image sensor.

Normally, according to the principles of generating one color line using each one line of RGB, the basic read line ratio of RGB is 1:1:1. However, as mentioned above, in the present invention, the ratio of light source lighting lines is not set to 1:1:1, but the number of light source lighting lines of B (blue), which is the complementary color of Y (yellow), is made twice those of R (red) and G (green), for example. Hence, even at a resolution with which moiré tends to occur, it is possible to scan/pick lines at intervals smaller than the dot intervals of an original expressed with dots (hereinafter referred to as a "dot original"). Thus, by performing a combining process of lines, it is possible to reduce frequency components causing moiré. In addition, it is also possible to control side effects, such as decrease in the read speed and slight degradation of the image quality caused by imbalance of the scan areas.

In such a case, the combining process of lines may be a process having a function to vary density such that the ratio of output lines to input lines is ½. For example, an averaging process using two lines that are not overlapping may be performed as the combining process. Hence, it is possible to set the final ratio of the number of lines of respective color components to 1:1:1, which follows the principles of original image reading.

Additionally, in the color image reading apparatus according to the present invention, the number of light source light lines of B (blue), which is the complementary color of Y (yellow), may be made twice those of R (red) and G (green). Thus, it is possible to repeat lighting in the order of a red light emitting diode, a blue light emitting diode and the blue light emitting diode, or to successively light the blue light emitting diode twice after lighting the red light emitting diode and then the blue light emitting diode, or after lighting the red light emitting diode following the lighting of the blue light emitting diode.

Further, it is possible to repeat the cycle of R, B, G and B as an arrangement of the light source lighting lines in a case where the ratio of B (blue) is set twice those of the other two colors. Hence, by arranging the light source lighting lines of B (blue) evenly with the double density, data can be taken at intervals with which the effect of smoothing is most likely to be obtained with respect to dots of Y (yellow) of a dot original where moiré tends to occur. Additionally, it is also possible to repeat the cycle of R, G, B and B as an arrangement of the light source lighting lines in a case where the ratio of B (blue) is set twice those of the other two colors. Hence, by arranging the light source lighting lines of B (blue) successively and with double density, it is possible to perform an analog combining process eliminating the use of the line memory in a case where a smoothing process of two lines is performed on dots of Y (yellow) of a dot original where moiré tends to occur. Further, by processing the successive light source light lines of B (blue) after separating them, it is possible to perform the smoothing process with high-efficiency on spatially separated and highly independent lines.

In addition, in the color image reading apparatus according to the present invention, the light source lighting frequency ratio setting part may further include a function to cancel the setting of the lighting frequency ratio of the light sources at which all of the light sources are equally lighted and to set the lighting frequency ratio of the light sources such that all of the light sources are equally lighted, and the ratio of the relative speed of the original image and a color image with the setting to the relative speed without the setting is ¾. That is, when the ratio of the number of the light source lighting lines of RGB is R:G:B=1:1:2, the original feeding speed or the moving speed of a scanner carrier is simultaneously reduced to ¾ of the speed in a case where R:G:B=1:1:1. In this manner, the operation of reading an original at the same resolution in the sub-scanning direction is achieved without varying the photoelectric conversion storage time of the image sensor. Regarding one-pass scan color reading where a given fact for the reading operation is that the line ratio of RGB is 1:1:1, in many cases, a driving system is constructed by assuming constant reading operation in the units of three lines. In such a case, when the photoelectric conversion storage time of the image sensor (=a scan time for one line) is constant, an original feeding step or a moving step of a scanner carrier is often varied in units of scan time for three lines. In such a case, it is impossible to slightly vary the original feeding speed or the moving speed of the scanner carrier in proportion to a case where the ratio of the number of lines of RGB is 1:1:2. Thus, there is no other choice but to reduce the speed to ½ of the original speed. It is possible for the color image reading apparatus according to the present invention to avoid such an excessive speed drop and perform the reading operation at an optimum speed.

Further, in a case where the ratio of the light source lighting lines of RGB is R:G:B=1:1:2, by reducing the photoelectric conversion storage time of the image sensor to ¾ of the original time at the same time, it is possible to achieve the original reading operation at the same resolution in the sub-scanning direction without varying the original feeding speed or the moving speed of the scanner carrier.

Also, in the color image reading apparatus according to the present invention, it is preferable that the read data combining part perform at least one of a band-pass filtering process on the digital image data generated by the analog-to-digital converter and a smoothing process by pixel using a smoothing circuit. Hence, it is possible to obtain image data of a desired resolution after reducing high-frequency components causing moiré. In addition, the two-line averaging process using the quantized image data after analog-to-digital conversion may be applied as a specific method of the combining process of lines. Thus, it is possible to perform the above-described reduction of the high-frequency components by using a line memory for one line and a small logical circuit.

Additionally, in the color image reading apparatus according to the present invention, the line memory and smoothing circuit need not always be used as the read data combining part. For example, a superimposing process for each pixel using analog video signal may be applied. Specifically, it is possible to perform an analog combining process in the image sensor by performing a line combining process through combining successive light source lighting lines of B (blue). In other words, it is possible to obtain the effect of the two-line averaging process by superimposing electrical charges for two lines of B (blue) by pixel by a charge storage part of the image sensor while stopping supply of a transfer clock to the image sensor during the photoelectric conversion storage time of the latter B (blue) with respect to the cycle of light source lighting lines of R, G, B and B. Hence, it is possible to achieve the present invention with a construction adding almost no extra hardware including an analog circuit.

The color image reading apparatus according to the present invention can be used by switching between the normal reading method and the above-described method having the function of reducing moiré. Hence, it is possible to control the fall in the read speed and slight degradation in the image quality caused by imbalance of the scan area, which fall and degradation follow when applying the present invention. When reading with a resolution close to that of a dot original, the switching may be performed automatically. Hence, it is possible to prevent moiré of a specific color from occurring even if a user is not aware of it.

Additionally, in the color image reading apparatus according to the present invention, the lighting frequency ratio of the light sources may be adjusted so as to reduce moiré of the original image read by the line sensor.

Further, according to another aspect of the present invention, there is provided a color image reading apparatus reading an original image by a line sensor through sequentially lighting respective light sources of a plurality of colors with respect to a scan line, including: an analog-to-digital converter converting an analog image signal read by said line sensor to digital image data; a line synchronizing pulse invalidation part invalidating a line sensor control pulse for one pulse with respect to the light source of a predetermined color; a lighting frequency ratio adjusting part adjusting the lighting frequency ratio of the light sources; a thinning control part performing thinning control according to the lighting frequency ratio; and a read data combining part combining read data of each of the colors obtained by the thinning control according to a predetermined combination.

Additionally, in the color image reading apparatus according to the present invention, the line synchronizing pulse invalidation part may invalidate line sensor control according to a line synchronizing pulse at a rate of one in four pulses, and the light sources of the plurality of colors may be red, green and blue light emitting diodes, the blue light emitting diode being lighted between the line synchronizing pulses before and after the invalidated line synchronizing pulse, and a lighting time of the blue light emitting diode may be longer than lighting times of the red and green light emitting diodes.

In addition, the line synchronizing pulse invalidation part may include a function to cancel the invalidation of the control, and the relative speed of the original image and a color image of when the setting is made may be set to ¾ of the relative speed of when the setting is canceled.

Further, the read data combining part may perform at least one of a band-pass filtering process on the digital image data generated by the analog-to-digital converter and a smoothing process on each pixel using a smoothing circuit.

Additionally, in the color image reading apparatus according to the present invention, the lighting times of the light sources may be adjusted so as to reduce moiré of the original image read by the line sensor.

Other objects, features and advantages of the present invention will become more apparent from the following detailed description when read in conjunction with the following drawings.

DETAILED DESCRIPTION OF THE PREFERRED EMBODIMENTS

Figure 3:
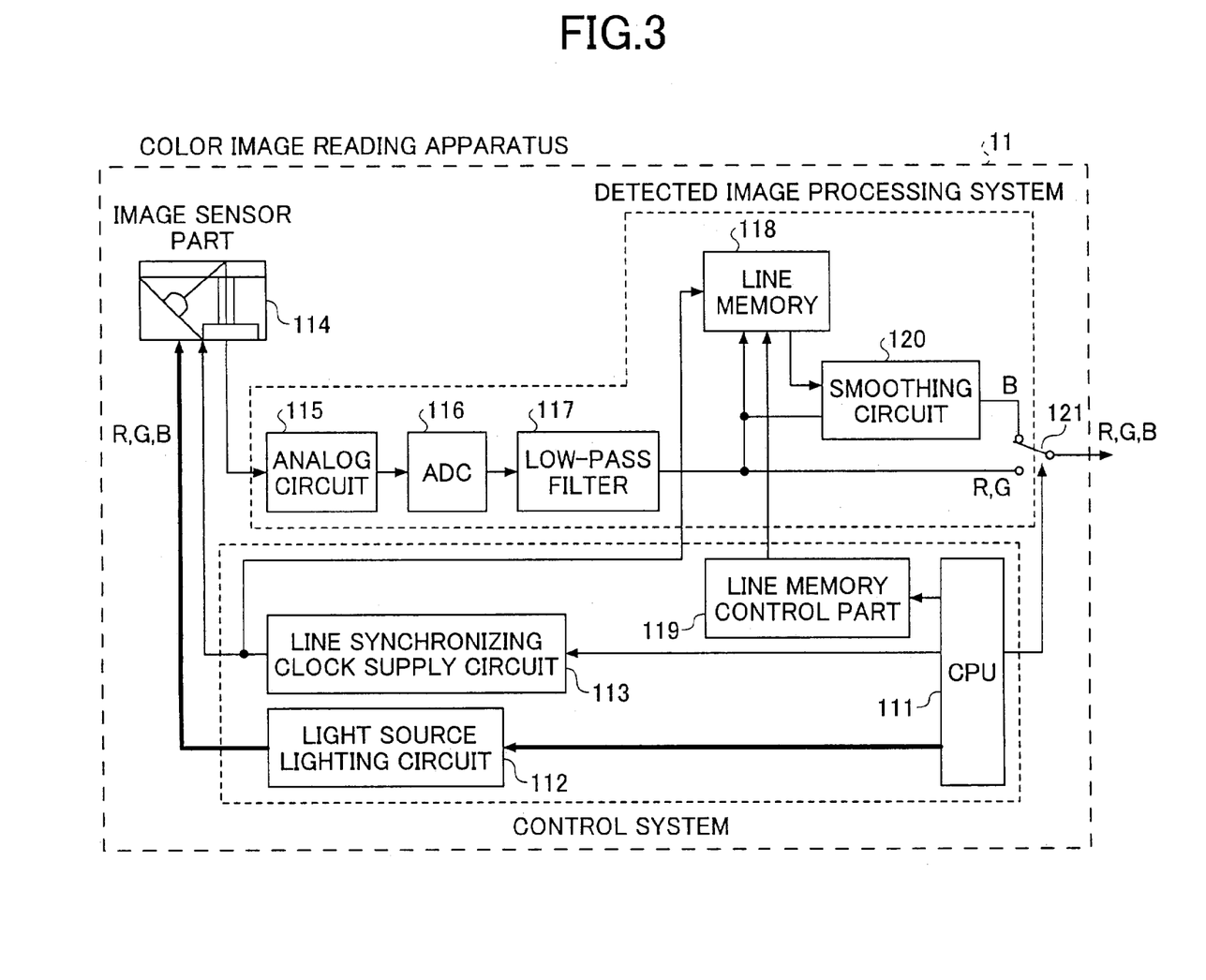
FIG. 3 is a block diagram showing an embodiment of a color image reading apparatus of the present invention.

FIG. 3 is a block diagram showing an embodiment of a color image reading apparatus of the present invention. In FIG. 3, a color image reading apparatus 11 includes a CPU 111, a light source lighting circuit 112, a line synchronizing clock supply circuit 113, an image sensor part 114, an analog circuit 115, an ADC (analog-to-digital converter) 116, a low-pass filter 117, a line memory 118, a line memory control part 119, a smoothing circuit (a circuit performing a thinning process) 120, and a changeover switch 121.

The CPU 111 controls the whole color image reading apparatus 11. The light source lighting circuit 112, the line synchronizing clock supply circuit 113 and the line memory control part 119 constitute the control system of the color image reading apparatus 11. The image sensor part 114 includes respective light emitting elements of R, G and B, a sensor and a color image scanning mechanism (including a lens, a mirror and the like).

The analog circuit 115, the ADC 116, the low-pass filter 117, the line memory 118, the smoothing circuit 120 and the changeover switch 121 constitute the detected image processing system.

An image sensor (not shown) of the image sensor part 114 outputs respective analog video signals of color components of RGB in a line scanning manner according to a synchronizing clock from the line synchronizing clock supply circuit 113 and a control signal from the light source lighting circuit 112.

The respective output video signals of the color components are quantized by the ADC 116 and thus can be handled as digital quantities. In the low-pass filter 117, digital filtering is performed on the digital video signals so as to eliminate high-frequency components in the main scanning direction. In this process, unnecessary frequencies such as noise are reduced in accordance with the resolution of the image sensor or the resolution of the final output image.

The line memory 118 can store image data for at least one line. In this embodiment, only image data of B (blue) are stored in the line memory 118. Image data of R (red) and G (green) are directly sent to the changeover switch 121.

The image data of B (blue) stored in the line memory 118 are read from the line memory 118 at the timing when the next image data of B (blue) are input. The previous image data of B (blue) and the next image data of B (blue) are sent to the smoothing circuit 120 at the timing such that pixels of the same main scanning position can be simultaneously processed.

Figure 4A:
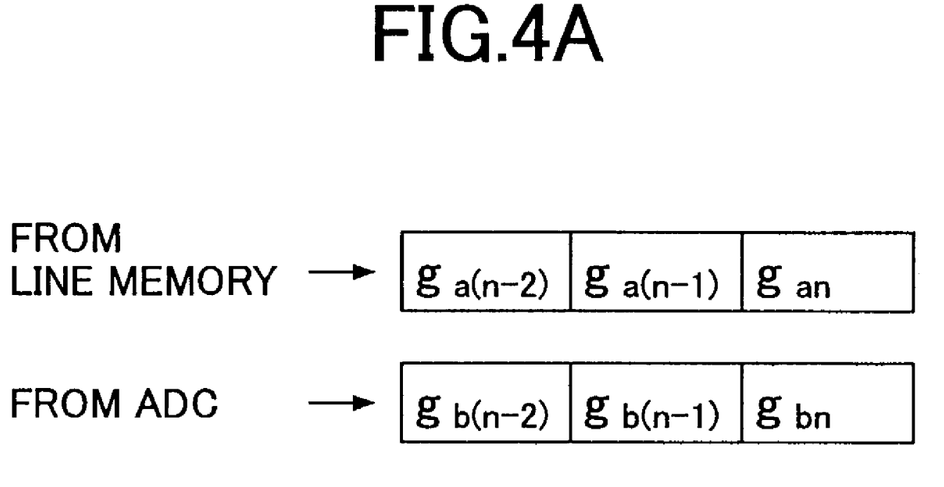
FIG. 4A is a schematic diagram showing a specific example of a smoothing process.
Figure 4B:
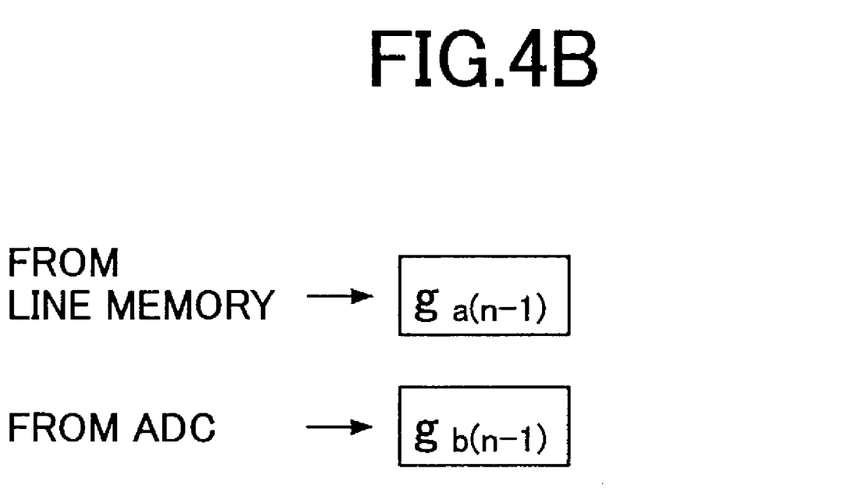
FIG. 4B is a schematic diagram showing another specific example of the smoothing process.

The smoothing circuit 120 performs a smoothing process on the image data for two lines and outputs image data for one line. FIGS. 4A and 4B show specific examples of the smoothing process. In FIGS. 4A and 4B, $g_{a(n-2)}$, $g_{a(n-1)}$ and $g_{an}$ represent three successive pixels obtained from the line memory 118 in the previous reading, and $g_{b(n-2)}$, $g_{b(n-1)}$ and $g_{bn}$ represent three successive pixels of this time obtained from the ADC 116.

In FIG. 4A, an output pixel value X can be obtained as follows.

$$X = (g_{a(n-2)} + 2 \times g_{a(n-1)} + g_{an} + g_{b(n-2)} + 2 \times g_{b(n-1)} + g_{bn})/8$$

In FIG. 4B, the output pixel value X can be obtained as follows.

$$X = (g_{a(n-1)} + g_{b(n-1)})/2$$

It is possible to apply a two line averaging process using the quantized image data after the AD conversion by the ADC 116. The averaging process can be achieved by performing a simple two line averaging process as the process performed in the smoothing circuit 120.

Since the number of lines of B (blue) is thinned out to ½ in the smoothing process, the smoothing process is not performed on the lines stored in the line memory 118, but performed in the smoothing circuit 120. Additionally, in this embodiment, the number of light source lighting lines of B (blue) is twice as many as those of the other colors (R (red) and G (green)). The smoothing circuit 120 performs a process to make the number of the lines of each of the color components equal.

In this embodiment, the operation of the smoothing circuit 120 is explained by assuming the case where the B (blue) lines are read at twice the rate (density) of those of the light source lighting lines of the other colors. However, the above-mentioned technique can also be applied to a case where the B (blue) lines are read at equal to or more than three times the rate of the light source lighting lines of the other colors.

For example, in a case where B (blue) lines are read at three times the rate of the light source lighting lines of the other colors, it is possible to make the number of lines of each color after the smoothing process be equal, by securing two B (blue) lines in the line memory 118 and performing the smoothing process on three lines in total, that is, the preceding two lines and the next one line.

In this embodiment, the CPU 111 manages the supply of the light source lighting signal to the image sensor part 114 from the light source lighting circuit 112, writing/reading operations of image data from the low-pass filter 117 to/from the line memory 118, control of the changeover switch 121, and the like, which enables the above-mentioned processes to be performed.

Figure 5:
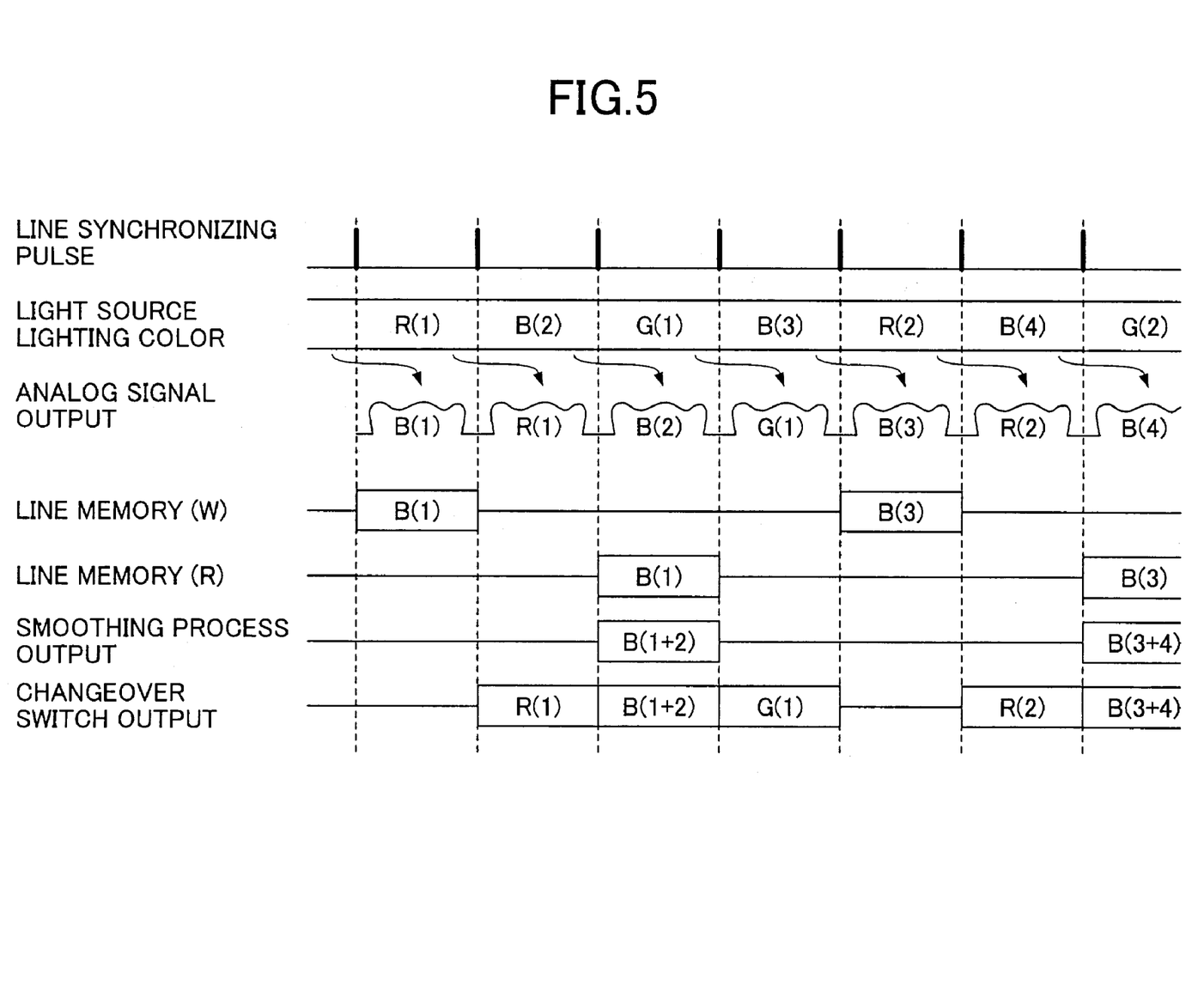
FIG. 5 is a timing chart showing a process performed in a case where a line to light B (blue) is set immediately after lines to light R (red) and G (green) as a sequence of lines to light respective light sources of R, G and B.

FIG. 5 shows a case where the light source lighting line of B (blue) is set immediately after the light source lighting line of R (red) and after the light source lighting line of G (green) for each as the sequence of light source lighting lines of the colors RGB. It should be noted that, in FIG. 5 (FIGS. 6, 7 and 9), for each light source lighting color (the color of the light source to be lighted) the color of the corresponding analog signal is shifted for one line, since an electric charge accumulated through photoelectric conversion in the reading cycle of the previous line is read as the analog signal.

Figure 6:
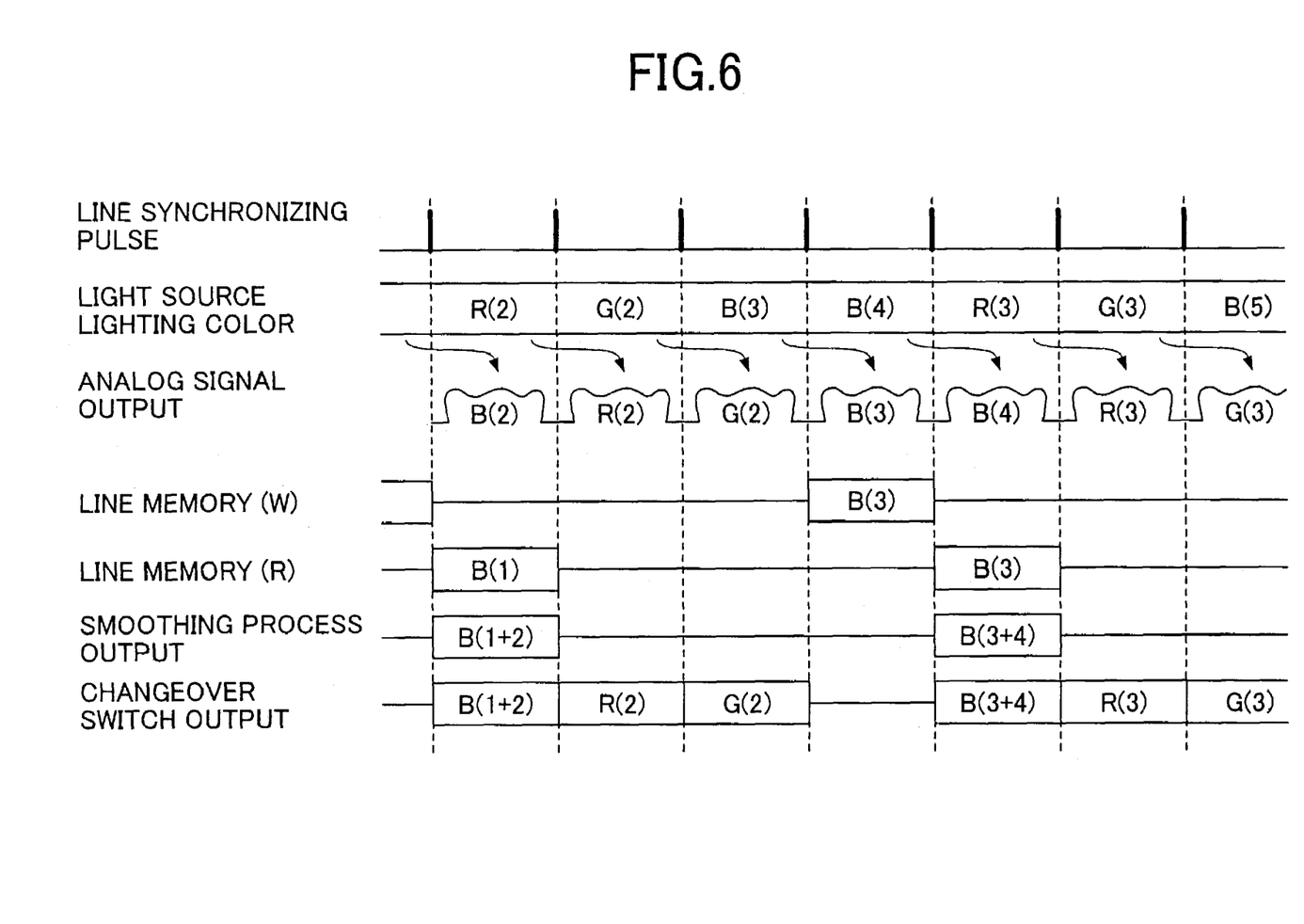
FIG. 6 is a timing chart showing a process performed in a case where two successive lines to light B (blue) are set immediately after lines to light R (red) and G (green) as a sequence of lines to light the respective light sources of R, G and B.
Figure 7:
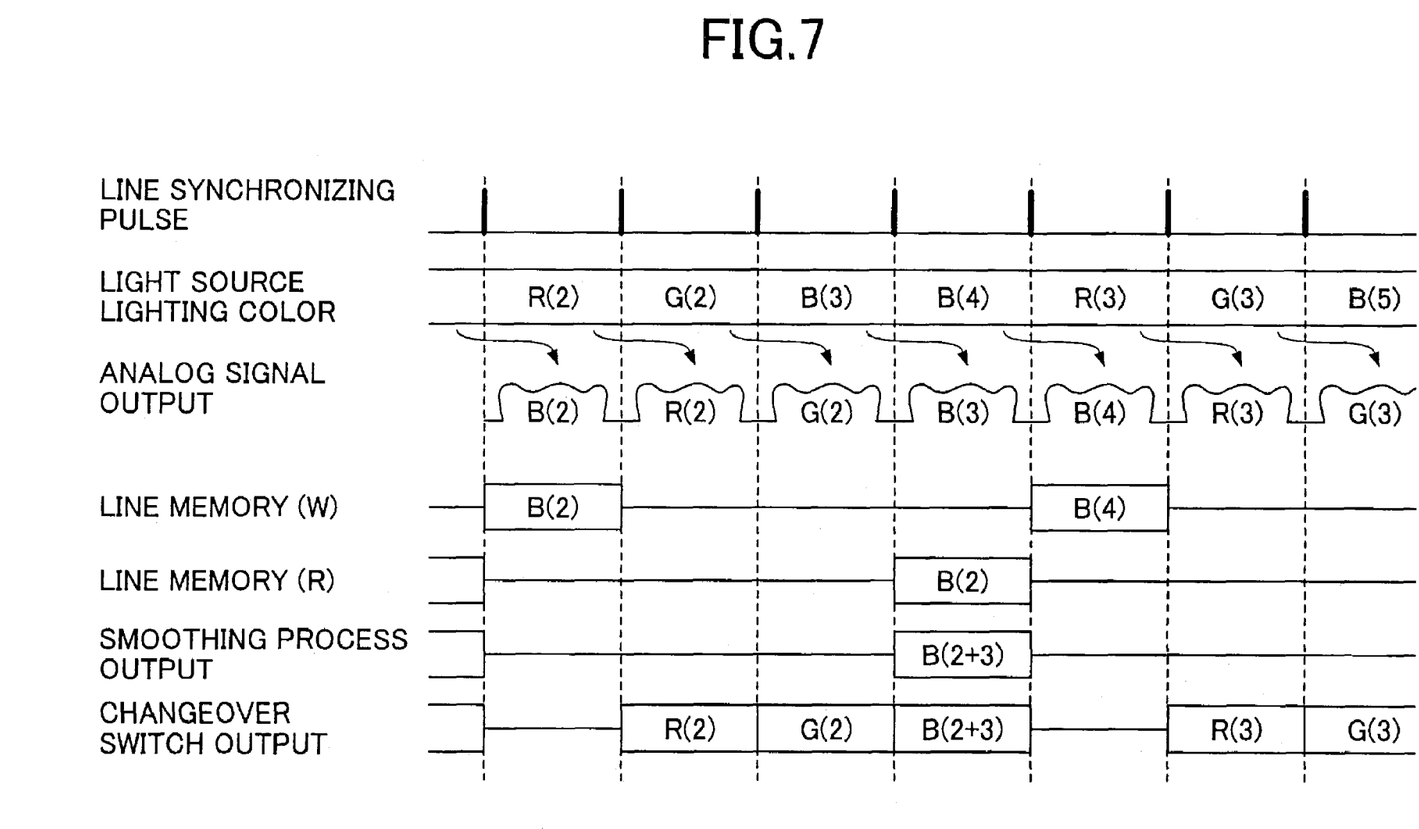
FIG. 7 is a timing chart showing another process performed in a case where two successive lines to light B (blue) are set immediately after lines to light R (red) and G (green) as a sequence of lines to light the respective light sources of R, G and B.

In FIGS. 6 and 7, the image data of B (blue) stored in the line memory 118 are read in the next line term, and the smoothing process is performed on the image data that are successively input. The image data of B (blue) stored in the line memory 118 are read in the input line term of the next image data of B (blue) after the image data of R (red) and G (green), and the smoothing process is performed on the read image data of B (blue) and the image data of B (blue) that are input then. It should be noted that B(x+y) indicates data obtained by performing the smoothing process on B(x) and B(Y) in FIGS. 6 and 7. In addition, FIG. 6 shows a case where the smoothing process is performed on B (blue) lines (B(3) and B(4), for example) that are scanned consecutively (no other intervening line). FIG. 7 shows a case where the smoothing process is performed on B (blue) lines that are not consecutively scanned.

The above-described control shown in FIGS. 6 and 7 is achieved by varying the timing of the control signal handled by the CPU 111.

Figure 8:
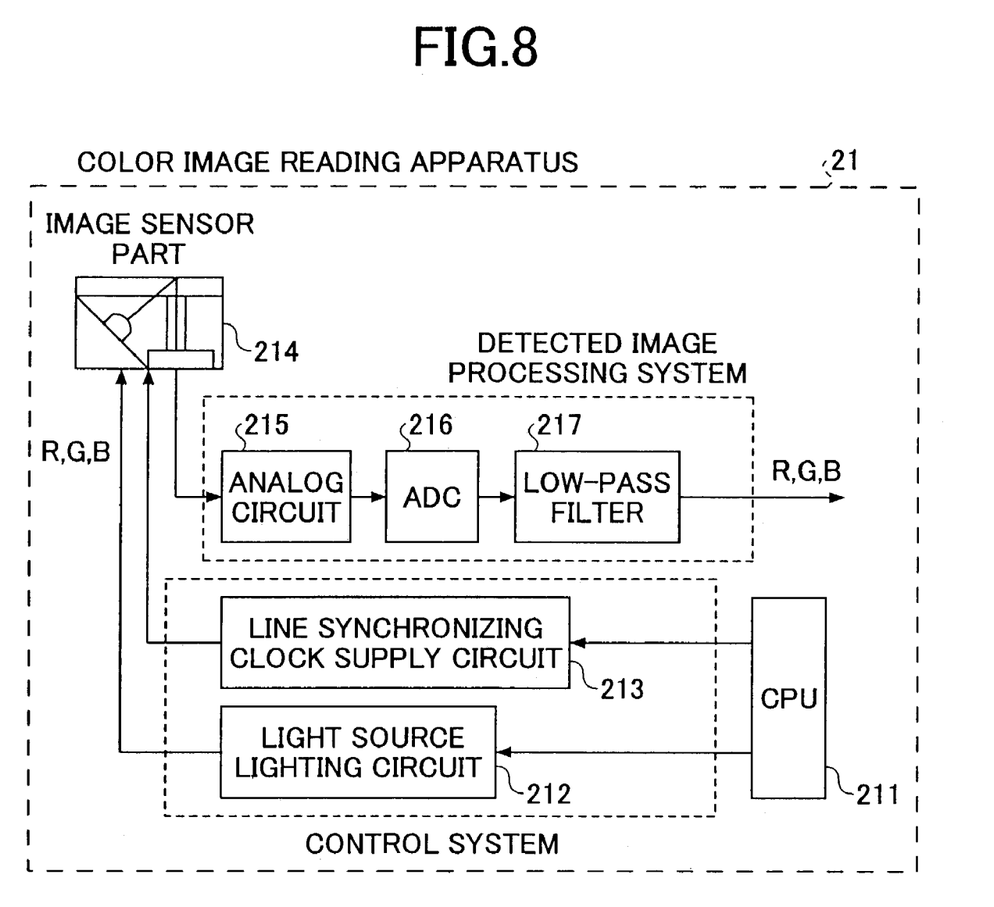
FIG. 8 is a block diagram showing a color image reading apparatus according to another embodiment of the present invention, which image reading apparatus does not use a line memory, smoothing circuit and changeover switch.

Further, as shown in FIG. 8, a color image reading apparatus that does not use the line memory, smoothing circuit and changeover switch may be used. In FIG. 8, a color image reading apparatus 21 includes a CPU 211, a light source lighting circuit 212, a line synchronizing clock supply circuit 213, an image sensor part 214, an analog circuit 215, an ADC (analog-to-digital converter) 216, and a low-pass filter 217. The color image reading apparatus 21 is constituted by eliminating the line memory 118, smoothing circuit 120 and changeover switch 121 of the color image reading apparatus 11 in FIG. 3. In the color image reading apparatus 21, the processes shown in FIGS. 6 and 7 are performed by controlling the light source lighting circuit 212 and line synchronizing clock supply circuit 213.

That is, the light sources are lighted in the lighting order as shown in FIG. 6 or FIG. 7, and video signals are superimposed in the image sensor part 214 by stopping the supply of the synchronizing clock to the image sensor part 214 by using software or hardware (not shown) in the successive (following) B (blue) light source lighting line.

Figure 9:
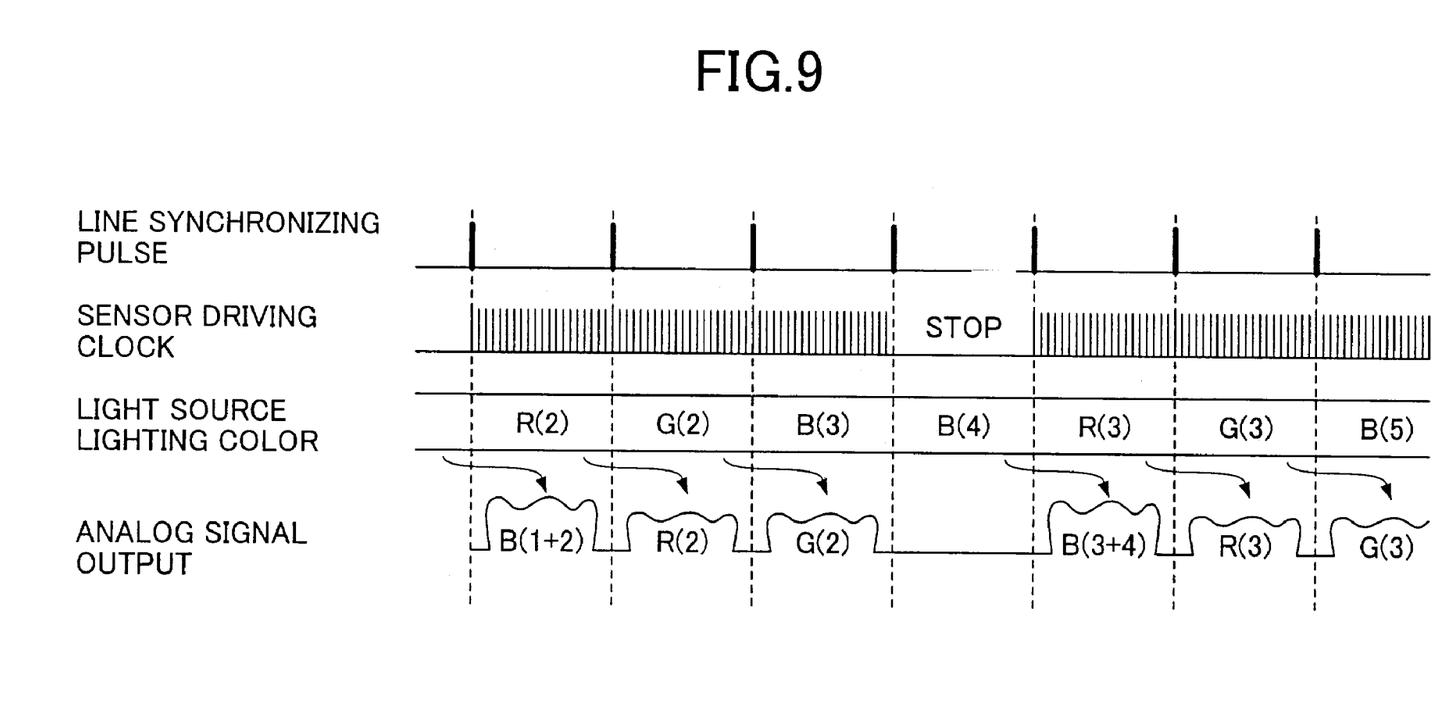
FIG. 9 is a timing chart showing the operation of the image color reading apparatus of FIG. 6.

At this moment, the analog signal of B (blue) becomes greater than the analog signals of the other colors when the video signals are simply superimposed. However, there are various countermeasures such as controlling the actual lighting period of the B (blue) light source in the line term, and switching the amplifier gain of only B (blue) signal at the analog signal level. It is possible to make the amplifier gain of the B (blue) signal 1/n of those of R (red) and G (green) signals. Here, n may be a positive integer or an arbitrary positive number. FIG. 9 shows an example of such operation.

Figure 10B:
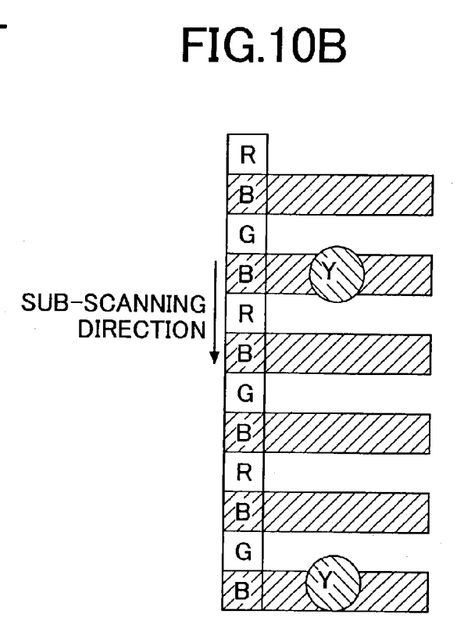
FIG. 10B is a schematic diagram for explaining the inhibition of moiré according to the present invention.
Figure 10C:
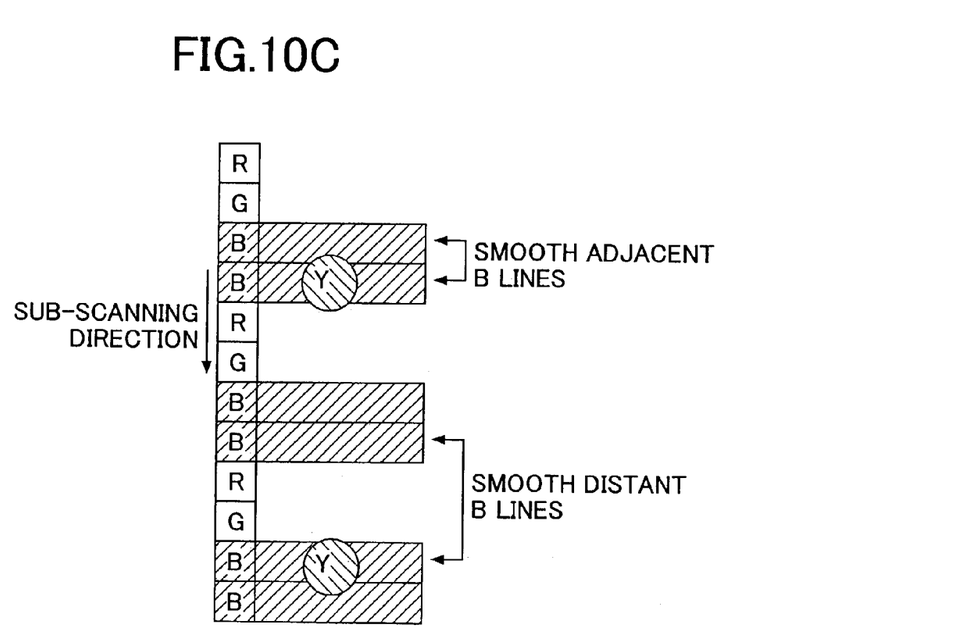
FIG. 10C is another schematic diagram for explaining the inhibition of moiré according to the present invention.

FIGS. 10B and 10C show cases where the scan area during one cycle of light source lighting (a cycle of lighting the light sources) is made the same as that of a conventional method by equally reducing the scan area in the sub-scanning direction of each color to ¾ of the original scan area so as not to vary the resolution in the sub-scanning direction, when the light source lighting line of B (blue) is lighted at twice the rate (density) of the other colors. It is possible to reduce the size of the scan area in the sub-scanning direction of each color to ¾ of the original size by reducing the speed of feeding an original or by reducing the moving speed of the scanner carrier, and maintaining the photoelectric conversion storage time of the image sensor as is. Alternatively, it is also possible to reduce the size of the scan area to ¾ of the original size by reducing the length of the photoelectric conversion storage time to ¾ of the original length, and maintaining the speed of feeding an original or the moving speed of the scanner carrier as is. FIG. 10B corresponds to the process shown in FIG. 5. FIG. 10C corresponds to the processes shown in FIGS. 6 and 7.

Figure 11:
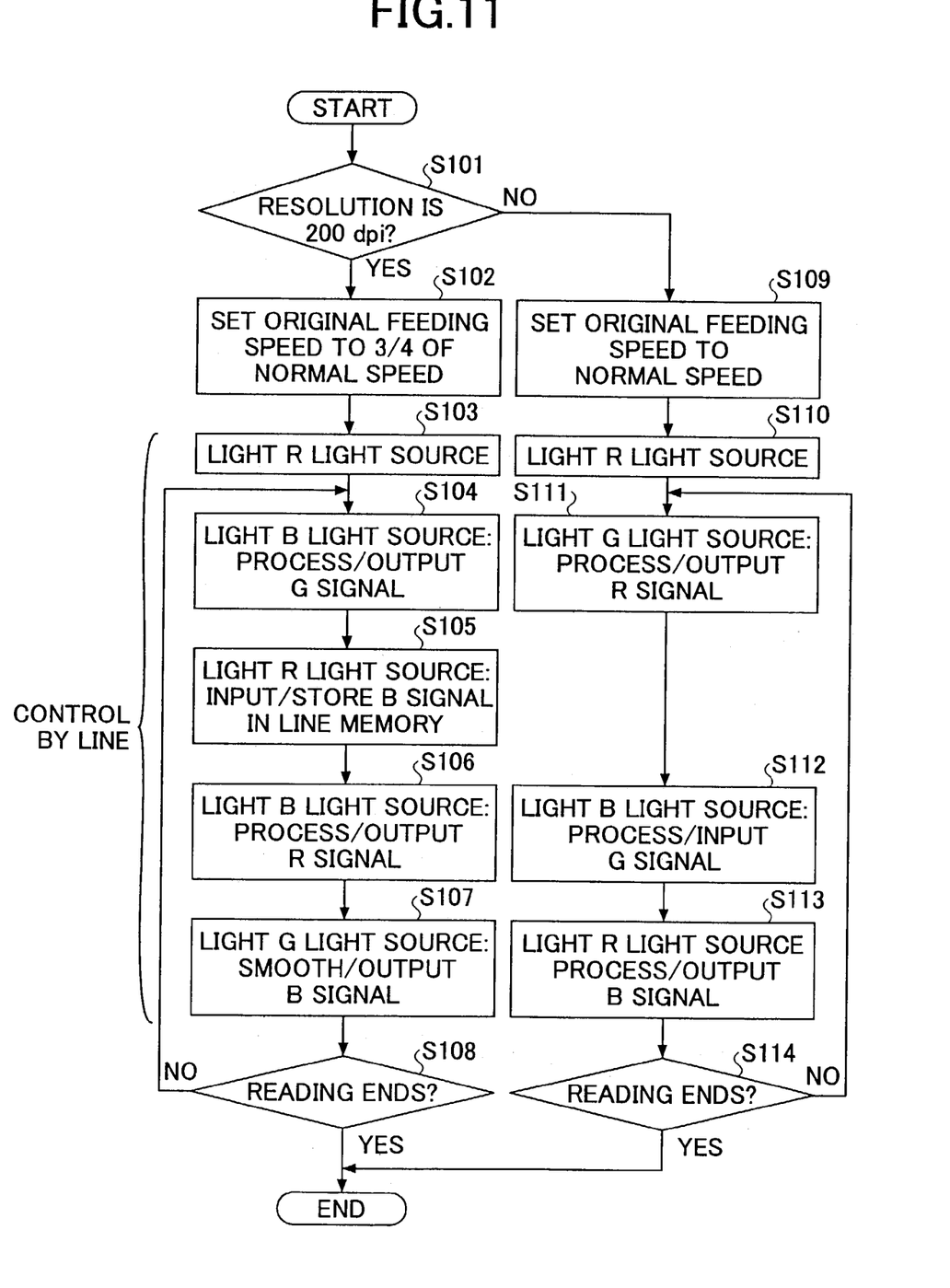
FIG. 11 is a flow chart showing the operation of the color image reading apparatus shown in FIG. 3.

A description will be given of the operation of the color image reading apparatus 11 shown in FIG. 3, with reference to the flow chart of FIG. 11. In FIG. 11, the light sources may be lighted as shown in FIG. 5 when reading at the resolution of 200 dpi, and to follow the normal light source lighting sequence with respect to the other resolutions.

Also, in the process shown in FIG. 11, a machine having a document feeding type reading part such as a facsimile machine is assumed, and the machine employs a method of reading an original by switching the speed of feeding the original so as not to vary the photoelectric conversion storage time for one line.

In FIG. 11, first, whether or not the resolution is 200 dpi is determined in step S101. When the resolution is 200 dpi (YES in step S101), the speed of feeding the original (original feeding speed) is set to ¾ of the normal speed in step S102. The R light source is lighted in step S103. In step S104, a G signal (data) is output via the analog circuit 115, ADC 116 and low-pass filter 117, and the B light source is lighted. Then, in step S105, a B signal is stored in the line memory 118 via the analog circuit 115, ADC 116 and low-pass filter 117, and the R light source is lighted. Thereafter, in step S106, an R signal (data) is output via the analog circuit 115, ADC 116 and low-pass filter 117, and the B light source is lighted. Then, in step S107, the smoothing circuit 120 performs the smoothing process on the B signal, and the G light source is lighted. In step S108, whether or not the reading ends is determined. The above-described process of steps S104 through S107 is repeated until the reading ends.

When the resolution is not 200 dpi (NO in step S101), a normal process is performed. That is, the original feeding speed is set to the normal speed in step S109, and the R light source is lighted in step S110. Then, in step S111, the R signal (data) is output via the analog circuit 115, ADC 116 and the low-pass filter 117, and the G light source is lighted. Thereafter, sequentially, the G signal (data) is output via the analog circuit 115, ADC 116 and low-pass filter 117, and the B light source is lighted in step S112. In step S113, the B signal (data) is output via the analog circuit 115, ADC 116 and low-pass filter 117, and the R light source is lighted. In step S114, whether or not the reading ends is determined. The above-mentioned process of steps S111 through S113 is repeated until the reading ends.

According to the present invention, the following effects can be achieved.

For example, by setting the ratio of the number of the light source lighting lines of R, G and B to other than 1:1:1 (e.g. 1:1:2), it is possible to vary the optical resolution in the sub-scanning direction of the light source of a certain color from those of the light sources of the other colors, and to perform on several lines a filtering process for reducing the amplitude of periodic variation of image data according to the ratio. Accordingly, it is possible to reduce or eliminate moiré in the sub-scanning direction that occurs with respect to a specific color when reading a color dot print while keeping the final resolution of each of the colors equal.

Also, the color image-reading apparatus according to the present invention can include a function to switch to a normal color reading function. Accordingly, it is possible to control moiré of a specific color by applying the present invention only to a read mode where it is highly likely that moiré occurs depending on the kind of an original and the condition of a resolution. On the other hand, with respect to the other modes, it is possible to avoid side effects of the present invention, such as reduction in the read speed and decrease in the S/N ratio. In addition, it is possible to automatically perform the above-described switching without an operation by a user.

Especially, in optical reading methods of RGB that are widely used, the ratio of the number of light source lighting lines of the B (blue) is set higher than those of the number of light source lighting lines of the R (red) and G (green) light sources. Thus, it is possible to reduce moiré in the sub-scanning direction that tends to occur with respect to vertical arrangement of Y (yellow) dots seen in a color dot print when reading with a relatively low resolution.

In a case where the ratio of the number of the light source lighting lines of R, G and B is 1:1:2, it is possible to reduce moiré in the sub-scanning direction that tends to occur with respect to vertical arrangement of Y (yellow) dots seen in a common color dot print when reading with a relatively low resolution. At the same time, it is also possible to control the side effects of the present invention, such as reduction in the read speed and decrease in the S/N ratio, as much as possible.

Additionally, by setting the ratio of the number of light source lighting lines of R, G and B to 1:1:2 and reducing the feeding speed of an original or the moving speed of the scanner carrier to ¾ of the original speed, it is possible to make the photoelectric conversion storage time equal to that in the case where the above ratio is 1:1:1 so as to reduce moiré without decreasing the S/N ratio of the video signal. Further, in a case where the ratio is set to 1:1:2 and the photoelectric conversion storage time of the image sensor is cut down to ¾ of the original time, it is possible to apply the present invention without extending original read time (time required for reading an original).

In addition, it is possible to apply the band-pass filtering process and thinning process using quantized data as a method of a combining process of lines. Therefore, it is possible to return the resolution to the same as those of the other colors after reducing a frequency component causing moiré in the main scan as well as sub scan and an unnecessary high-frequency component with respect to the final resolution. Thus, it is possible to control the degradation of the image quality, such as blur in the edges, as much as possible.

The present invention is not limited to the specifically disclosed embodiments, and variations and modifications may be made without departing from the scope of the present invention.

The present application is based on Japanese priority applications No. 2002-044264 filed on Feb. 21, 2002, and No. 2002-353408 filed on Dec. 5, 2002, the entire contents of which are hereby incorporated by reference.

What is claimed is:

1. A color image reading apparatus reading an original image by a line sensor through sequentially lighting respective light sources of a plurality of colors with respect to a scan line, comprising:
   an analog-to-digital converter converting an analog image signal read by said line sensor to digital image data;
   a lighting frequency ratio setting part setting a lighting frequency ratio for each of the light sources such that at least one of the lighting frequency ratios is different from others;
   a smoothing part performing a smoothing process of lighting lines according to the lighting frequency ratios set by the lighting frequency ratio setting part; and
   a read data combining part combining read data of the plurality of colors according to a predetermined combination, said read data being obtained by the smoothing process.

2. The color image reading apparatus as claimed in claim 1, wherein the light sources of the plurality of colors are red, green and blue light emitting diodes,
   and said blue light emitting diode is more frequently lighted than said red and green light emitting diodes.

3. The color image reading apparatus as claimed in claim 2, wherein the number of times of lighting the blue light emitting diode is 2 where the numbers of times of lighting the red and green light emitting diodes are 1.

4. The color image reading apparatus as claimed in claim 3, wherein the red, blue and green diodes are repeatedly lighted in the order of the red light emitting diode, the blue light emitting diode, the green light emitting diode and the blue light emitting diode,
   or the blue light emitting diode is successively lighted twice after lighting the red light emitting diode and then the green light emitting diode or after lighting the green light emitting diode and then the red light emitting diode.

5. The color image reading apparatus as claimed in claim 4, wherein the lighting frequency ratio setting part further includes a function to cancel the setting of the lighting frequency ratios in which at least of the lighting frequency ratios is different from the others and to set lighting frequency ratios of the light sources such that all of the lighting frequency ratios are equal to each other, and a relative speed of the original image and a color image in a case where the setting is made is ¾ of the relative speed in a case where the setting is canceled.

6. The color image reading apparatus as claimed in claim 3, wherein the lighting frequency ratio setting part further includes a function to cancel the setting of the lighting frequency ratio at which not all of the light sources are equally lighted and to set a lighting frequency ratio of the light sources such that all of the light sources are equally lighted, and a relative speed of the original image and a color image in a case where the setting is made is ¾ of the relative speed in a case where the setting is canceled.

7. The color image reading apparatus as claimed in claim 1, wherein the read data combining part performs at least one of a band-pass filtering process on the digital image data generated by the analog-to-digital converter and a smoothing process by pixel using a smoothing circuit.

8. The color image reading apparatus as claimed in claim 1, wherein the lighting frequency ratio of the light sources is adjusted so as to reduce moiré of the original image read by the line sensor.

9. A color image reading apparatus reading an original image by a line sensor through sequentially lighting respective light sources of a plurality of colors with respect to a scan line, comprising:
   an analog-to-digital converter converting an analog image signal read by said line sensor to digital image data;
   lighting frequency ratio setting means for setting a lighting frequency ratio for each of the light sources such that at least one of the lighting frequency ratios is different from others;
   thinning control means for performing a smoothing process of lighting lines according to the lighting frequency ratios set by the lighting frequency ratio setting means; and
   read data combining means for combining read data of the plurality of colors according to a predetermined combination, said read data being obtained by the smoothing process.

10. The color image reading apparatus as claimed in claim 9, wherein the light sources of the plurality of colors are red, green and blue light emitting diodes,
   and said blue light emitting diode is more frequently lighted than said red and green light emitting diodes.

11. The color image reading apparatus as claimed in claim 10, wherein the number of times of lighting the blue light emitting diode is 2 where the numbers of times of lighting the red and green light emitting diodes are 1.

12. The color image reading apparatus as claimed in claim 11, wherein the red, blue and green diodes are repeatedly lighted in the order of the red light emitting diode, the blue light emitting diode, the green light emitting diode and the blue light emitting diode,
   or the blue light emitting diode is successively lighted twice after lighting the red light emitting diode and then the green light emitting diode or after lighting the green light emitting diode and then the red light emitting diode.

13. The color image reading apparatus as claimed in claim 12, wherein the lighting frequency ratio setting means further includes a function to cancel the setting of the lighting frequency ratios in which at least one of the lighting frequency ratios is different from the others and to set lighting frequency ratios of the light sources such that all of the lighting frequency ratios are equal to each other, and a relative speed of the original image and a color image in a case where the setting is made is ¾ of the relative speed in a case where the setting is canceled.

14. The color image reading apparatus as claimed in claim 11, wherein the lighting frequency ratio setting means further includes a function to cancel the setting of the lighting frequency ratios in which at least one of the lighting frequency ratios is different from the others and to set lighting frequency ratios of the light sources such that all of the lighting frequency ratios are equal to each other, and a relative speed of the original image and a color image in a case where the setting is made is ¾ of the relative speed in a case where the setting is canceled.

15. The color image reading apparatus as claimed in claim 9, wherein the read data combining means performs at least one of a band-pass filtering process on the digital image data generated by the analog-to-digital converter and a smoothing process by pixel using a smoothing circuit.

16. The color image reading apparatus as claimed in claim 9, wherein the lighting frequency ratio of the light sources is adjusted so as to reduce moiré of the original image read by the line sensor.

17. A method of reading an original image by a line sensor through sequentially lighting respective light sources of a plurality of colors with respect to a scan line, comprising the steps of:
    (a) converting an analog image signal read by said line sensor to digital image data;
    (b) setting a lighting frequency ratio for the light sources such that not all of the lighting frequency ratios is different from others;
    (c) performing a smoothing process of lighting lines according to the lighting frequency ratios set in step (b); and
    (d) combining read data of the plurality of colors according to a predetermined combination, said read data being obtained by the smoothing process.

18. A color image reading apparatus reading an original image by a line sensor through sequentially lighting respective light sources of a plurality of colors with respect to a scan line, comprising:
    an analog-to-digital converter converting an analog image signal read by said line sensor to digital image data;
    a line synchronizing pulse invalidation part invalidating a line sensor control pulse for one pulse with respect to the light source of a predetermined color;
    a lighting frequency ratio adjusting part adjusting a lighting frequency ratio of each of the light sources such that at least one of the lighting frequency ratios is different from others;
    a thinning control part performing a smoothing process of lighting lines according to the lighting frequency ratios set by the lighting frequency ratio setting part; and
    a read data combining part combining read data of the plurality of colors according to a predetermined combination, said react data being obtained by the smoothing process.

19. The color image reading apparatus as claimed in claim 18, wherein the line synchronizing pulse invalidation part invalidates line sensor control according to a line synchronizing pulse at a rate of one in four pulses, and
    the light sources of the plurality of colors are red, green and blue light emitting diodes, said blue light emitting diode being lighted between the line synchronizing pulses before and after the line synchronizing pulse at which the line sensor control is invalidated, and a lighting period of said blue light emitting diode being longer than lighting periods of the red and green light emitting diodes.

20. The color image reading apparatus as claimed in claim 19, wherein the line synchronizing pulse invalidation part includes a function to cancel the invalidation of the line sensor control, and
    a relative speed of the original image and a color image in a case where the setting is made is ¾ of the relative speed in a case where the setting is canceled.

21. The color image reading apparatus as claimed in claim 18, wherein the read data combining part performs at least one of a band-pass filtering process on the digital image data generated by the analog-to-digital converter and a smoothing process on each pixel using a smoothing circuit.

22. The color image reading apparatus as claimed in claim 18, wherein lighting periods of the light sources are adjusted so as to reduce moiré of the original image read by the line sensor.

23. A color image reading apparatus reading an original image by a line sensor through sequentially lighting respective light sources of a plurality of colors with respect to a scan line, comprising:
    an analog-to-digital converter converting an analog image signal read by said line sensor to digital image data;
    line synchronizing pulse invalidation means for invalidating a line sensor control pulse for one pulse with respect to the light source of a predetermined color;
    lighting frequency ratio adjusting means for adjusting a lighting frequency ratio of each of the light sources such that at least one of the lighting frequency ratios is different from others;
    thinning control means for performing smoothing process of lighting lines according to the lighting frequency ratios set by the lighting frequency ratio setting means; and
    read data combining means for combining read data of the plurality of colors according to a predetermined combination, said read data being obtained by the smoothing process.

24. The color image reading apparatus as claimed in claim 23, wherein the line synchronizing pulse invalidation means invalidates line sensor control according to a line synchronizing pulse at a rate of one in four pulses, and
    the light sources of the plurality of colors are red, green and blue light emitting diodes, said blue light emitting diode being lighted between the line synchronizing pulses before and after the line synchronizing pulse at which the line sensor control is invalidated, and a lighting period of said blue light emitting diode being longer than lighting periods of the red and green light emitting diodes.

25. The color image reading apparatus as claimed in claim 24, wherein the line synchronizing pulse invalidation means includes a function to cancel the invalidation of the line sensor control, and
    a relative speed of the original image and a color image in a case where the setting is made is ¾ of the relative speed in a case where the setting is canceled.

26. The color image reading apparatus as claimed in claim 23, wherein the read data combining means performs at least one of a band-pass filtering process on the digital image data generated by the analog-to-digital converter and a smoothing process on each pixel using a smoothing circuit.

27. The color image reading apparatus as claimed in claim 23, wherein lighting periods of the light sources are adjusted so as to reduce moiré of the original image read by the line sensor.

28. A method of reading an original image by a line sensor through sequentially lighting respective light sources of a plurality of colors with respect to a scan line, comprising the steps of:
    (a) converting an analog image signal read by said line sensor to digital image data;
    (b) invalidating a line sensor control pulse for one pulse with respect to the light source of a predetermined color;

(c) adjusting a lighting frequency ratio of each of the light sources such that at least one of the lighting frequency ratios is different from others;
(d) performing a smoothing process of lighting lines according to the lighting frequency ratios set in step (c); and
(e) combining read data of the plurality of colors according to a predetermined combination, said read data being obtained by the smoothing process.

* * * * *